United States Patent [19]

Klatt et al.

[11] Patent Number: 4,648,291
[45] Date of Patent: Mar. 10, 1987

[54] TRANSMISSION CONTROL APPARATUS AND METHOD FOR DETERMINING SHIFT SIGNALS ON DOWNHILL SLOPES

[75] Inventors: Alfred Klatt, Wathlingen; Erich Reinecke, Burgdorf, both of Fed. Rep. of Germany

[73] Assignee: WABCO Westinghouse Fahrzeugbremsen GmbH, Hanover, Fed. Rep. of Germany

[21] Appl. No.: 654,815

[22] Filed: Sep. 26, 1984

[30] Foreign Application Priority Data

Sep. 26, 1983 [DE] Fed. Rep. of Germany ....... 3334718

[51] Int. Cl.$^4$ ........................................... B60K 41/18
[52] U.S. Cl. ...................................... 74/866; 74/856; 364/424.1
[58] Field of Search ................. 74/866, 843, 854, 855, 74/856, 844, 861, 862, 865; 364/424.1

[56] References Cited

U.S. PATENT DOCUMENTS

| | | | |
|---|---|---|---|
| 3,640,156 | 2/1972 | Mori et al. | 74/866 |
| 3,881,368 | 5/1975 | Furuhashi et al. | 74/866 |
| 4,231,092 | 10/1980 | Grob et al. | 364/424.1 X |
| 4,373,619 | 2/1983 | Schritt et al. | 74/866 X |
| 4,386,688 | 6/1983 | Sato et al. | 74/866 X |
| 4,421,192 | 12/1983 | Ito et al. | 74/866 X |
| 4,422,350 | 12/1983 | Muller et al. | 364/424.1 X |
| 4,438,664 | 3/1984 | Fiala | 74/866 |
| 4,471,437 | 9/1984 | Yoshino et al. | 364/424.1 |
| 4,548,079 | 10/1985 | Klatt | 364/424.1 |

FOREIGN PATENT DOCUMENTS

| | | | |
|---|---|---|---|
| 2709235 | 9/1978 | Fed. Rep. of Germany | 74/866 |
| 3018032 | 11/1981 | Fed. Rep. of Germany | 74/866 |
| 3139985 | 2/1983 | Fed. Rep. of Germany | |
| 2042105 | 9/1980 | United Kingdom | 74/866 |

Primary Examiner—Kenneth J. Dorner
Assistant Examiner—David Novais
Attorney, Agent, or Firm—J. O. Ray

[57] ABSTRACT

A transmission control is disclosed for a road vehicle for the determination of shift signals on downhill slopes. The invention includes a device for the determination of the stationary or constant speed drive torque $M_{stat}$, which is necessary for the unaccelerated drive of the vehicle. The transmission control also includes a downhill gear classification device to coordinate the selection of a gear which is suitable for the downhill slope in question with a torque comparator in which various values of the stationary torque $M_{stat}$ are classified with the suitable downhill gear $i_x$. A blocking element prevents a gear shift if a gear to be engaged by a shift command transmitter is higher than the suitable gear with the transmission ratio $i_x$.

11 Claims, 1 Drawing Figure

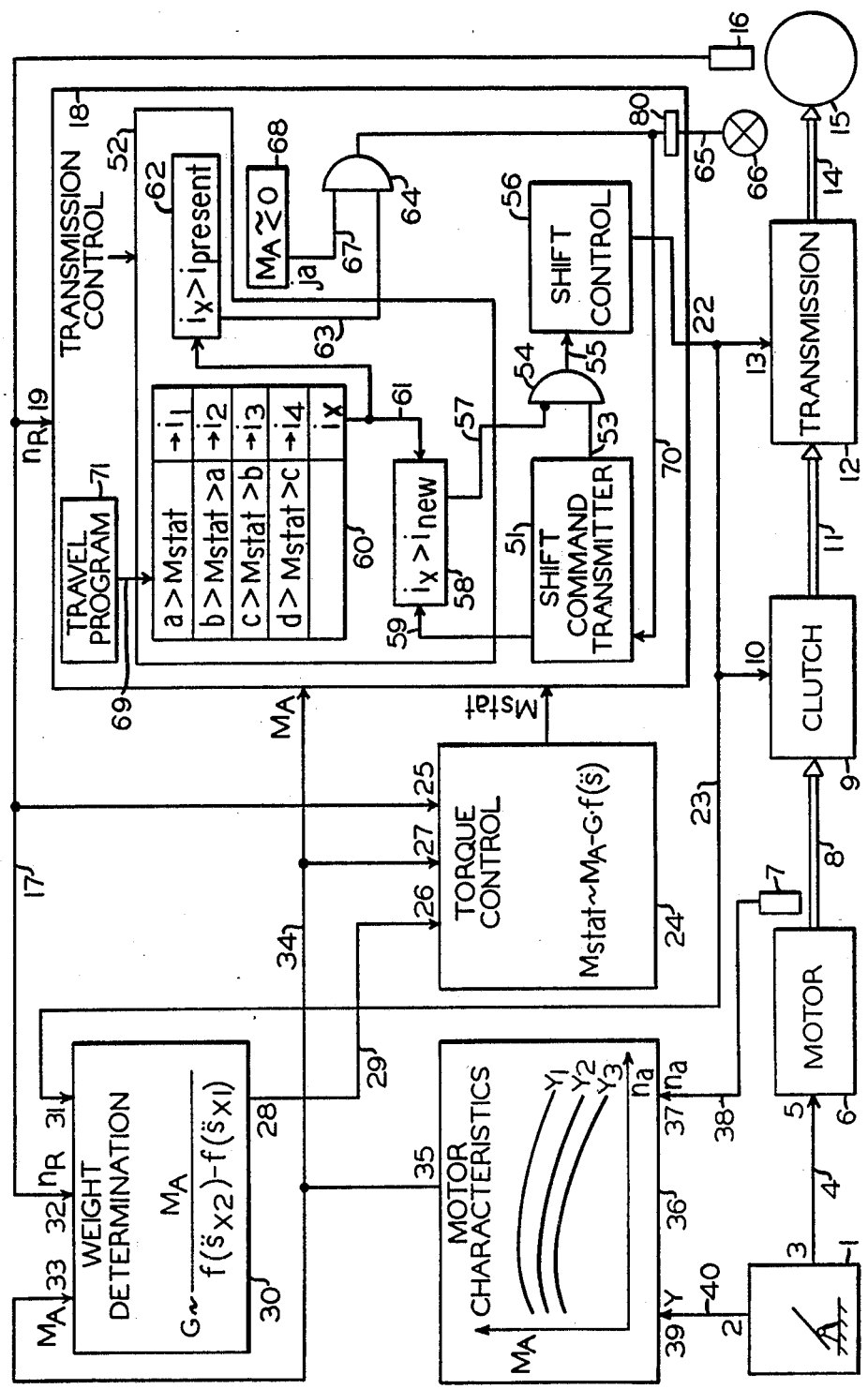

4,648,291

TRANSMISSION CONTROL APPARATUS AND METHOD FOR DETERMINING SHIFT SIGNALS ON DOWNHILL SLOPES

BACKGROUND OF THE INVENTION

The present invention relates in general to vehicle transmissions and, more particularly, to an on vehicle apparatus to determine transmission gears engageable on a vehicle to achieve a predetermined amount of engine braking effect as such vehicle traverses a downhill grade of a roadway.

During travel in hilly areas of a country, it often happens that the driver of a commercial or utility road vehicle does not have sufficient orientation concerning what sort of uphill or downhill slope he is travelling on, because there are normally no indicators on the vehicle to provide him with this information. This can have negative consequences, especially if he has underestimated a particular downhill slope, and therefore travels thereover at an excessive speed. On vehicles with continuously variable transmissions, the generally-known rule applies, that the vehicle should travel down the hill in the gear which would be used to travel up the hill. This can also be logically applied to the speed of travel of such vehicle.

Even on commercial vehicles which are equipped with automatic transmissions, automatic assists, or shift indicators, this problem can and often does occur. The automatic mechanism, when the vehicle is travelling downhill, generally selects a gear which is too high, and then the braking action of the motor is not used to sufficient advantage.

Another problem is that the transmission ratio or the speed of travel, which is optimal when travelling downhill, is a function of both the slope and the weight of the vehicle. When the vehicle is travelling with a heavy load, a lower speed is more appropriate, so that the stopping distance in an emergency will not be too long.

A control for an automatic transmission in which the transmission ratio of the transmission is increased when the brakes are applied is described in German application No. DE-OS 31 39 985, the teaching of which is incorporated herein by reference. In this control scheme, the braking action of the motor during braking is taken advantage of. But a disadvantage of this arrangement is that no distinction is made between a level road and a downhill slope, nor are the steepness of the slope or the weight of the vehicle taken into consideration. In addition, a constant shifting of gears while braking is inconvenient for the driver of the vehicle.

SUMMARY OF THE INVENTION

The present invention teaches an on vehicle apparatus to determine transmission gears engageable on a vehicle traversing a downhill grade of a roadway to achieve a predetermined minimum braking effect from the motor of such vehicle. The apparatus comprises a means positioned on such vehicle for generating a first signal having a value representative of the instantaneous drive torque ($M_A$) of such vehicle. A means is also provided on such vehicle for generating a second signal having a value representative of the constant speed drive torque ($M_{stat}$) of such vehicle. A first comparator is connected to receive the value of the second signal to compare that value with a function which correlates the relationship between the values of $M_{stat}$ with the steepness of a downhill grade and generates a third signal having a value representative of a gear ratio that will provide a predetermined minimum braking effect of the motor on such vehicle.

A means is provided to determine if the drive torque $M_A$ is tending to retard such vehicle and for generating a fourth signal representative of the retarding drive torque.

A comparator means is connected to receive the value of the gear ratio signal to compare that value with a value representative of the engaged gear ratio and generate a fifth signal when the value of the engaged gear ratio is less than the value of the gear ratio signal.

A logic AND element is connected to receive the fourth signal and the fifth signal for generating a sixth signal indicative of a permissible gear change when both the fourth signal and the fifth signal are simultaneously received by the logic AND element.

OBJECTS OF THE INVENTION

It is, therefore, one of the primary objects of the present invention to provide a method and apparatus to select a transmission gear ratio for a vehicle traversing a downhill grade of a roadway that will provide at least some predetermined braking effect of such vehicle's engine.

Another object of the present invention is to provide a method and apparatus to select a transmission gear ratio for a vehicle which is equally applicable to either a manual or to an automatic transmission.

Still another object of the invention is to provide a method and apparatus to select a transmission gear ratio for a vehicle which can take into account the current downhill slope of the roadway in addition to the weight of the vehicle.

Yet still another object of the invention is to provide a method and apparatus to select a transmission gear ratio in which a retarder may be used on the vehicle and is used as one of the selection criteria for the transmission gear ratio.

These and various other objects and advantages of the invention will become more apparent to those persons skilled in the transmission art from the following more detailed description when taken in conjunction with the attached drawing and the appended claims.

BRIEF DESCRIPTION OF THE DRAWING

The single FIGURE is a schematic representation of a transmission control device incorporating the present invention.

DESCRIPTION OF THE PREFERRED AND ALTERNATIVE EMBODIMENTS OF THE INVENTION

Now with specific reference to the drawing, there is shown a simplified representation of the essential elements of the invention incorporated on a vehicle driven by a drive machine. According to the invention, the drive machine is an internal combustion motor 6, the fuel feed to which can be controlled by means of a transmitter 1. By means of a shaft 8, the motor 6 is connected with a clutch 9. The clutch 9 is connected by means of a shaft 11 with a transmission 12.

The transmission 12 is used to drive an axle 14, which axle 14 drives the drive wheels 15 of the vehicle. For the sake of simplicity, only one drive wheel 15 of the driven wheels 15 of the vehicle is shown.

The transmitter 1 for the control of the fuel fed to the motor 6 has a signal output 3, which is connected via a signal line 4 with a signal input 5 of the motor 6. The transmitter 1 is also equipped with a device which detects the position of the transmitter 1 and transmits such position as a signal value y. This signal value y can be called up on another signal output 2 of the transmitter 1. In the simplest case, the transmitter 1 contains, as the control element of the fuel feed to the motor 6, an ordinary, mechanically-operated gas pedal. The transmitter 1, however, can also—as in the example illustrated—be designed as an electrical or electronic transmitter, whereby the motor 6 is correspondingly controlled by means of a control signal.

The clutch 9 located between the drive-side shaft 8 and the driven-side shaft 11 can be activated by means of a control signal 23, which can be conducted to a signal input 10 of the clutch 9.

The transmission 12 can also be controlled electrically, whereby a signal input 13 of the transmission 12 is used to receive corresponding control signals 23 for the engagement of the desired or required gear. Both the clutch 9 and the transmission 12 can, in the simplest case, be activated purely mechanically. In this case, the signal inputs 10 and 13 symbolically represent the connection of the clutch activation mechanism and the transmission activation mechanisms with the corresponding activation apparatus for the clutch 9 and the transmission 12.

In a torque control 24, the current stationary drive torque or constant speed drive torque $M_{stat}$ is determined by calculating the difference between the actual current instantaneous drive torque of the vehicle $M_A$ applied by the motor 6 and the calculated value of the instantaneous acceleration $\ddot{s}$ of the vehicle. The constant speed or stationary drive torque is the torque which would be necessary for a nonaccelerating drive of the vehicle. It is independent of the gear currently engaged and could be determined, for example, by means of a suitable sensor during uniform travel on the cardan shaft. However, this arrangement is significantly more expensive than the calculation described below. In addition, for a more detailed understanding of a highly suitable method of determining the constant speed drive torque, see copending U.S. patent application Ser. No. 590,247, filed on Mar. 16, 1984 and incorporated herein by reference.

In order to compute the above mentioned difference in a simple manner, the torque control apparatus 24 receives, via a signal input 27, the instantaneous drive torque $M_A$ of the motor 6; via a signal input 26, the weight G of the vehicle; and via a signal input 25, the rotational speed $n_R$ of the driven wheel 15.

The signal input 27 of the torque control apparatus 24 is connected via a line 34 to the signal output 35 of a motor characteristics memory storage unit 36, which makes available at the above-mentioned signal output 35, a signal which corresponds to the instantaneous drive torque $M_A$ of the motor 6 determined as function of the position of the fuel transmitter 1 and the rotational speed $n_A$ of the motor 6 determined by sensor 7.

The signal input 26 of the torque control 24 is connected, via a signal line 29, to a weight determination apparatus 30 for the determination of the weight G of the vehicle. At a signal output 28 of the weight determination apparatus 30, a signal is available which corresponds to the weight G of the vehicle. For a more detailed description with respect to a suitable weight determination apparatus 30, reference can be made to copending U.S. patent application Ser. No. 557,789, now U.S. Pat. No. 4,548,079 filed Dec. 5, 1983, and incorporated herein by reference.

The signal input 25 of the torque control 24 is then connected, via a signal line 17, with a speed-of-rotation transmitter 16 for the measurement of the rotational speed of the wheel $n_R$.

In the torque control 24, by means of differentiation from the temporal curve of the rotational speed $n_R$, the acceleration $\ddot{s}$ of the vehicle is calculated.

The current instantaneous drive torque $M_A$ of the motor 6 is determined from a family of motor characteristics stored in memory storage unit 36, which includes, in a table, the dependence of the following values on one another: instantaneous drive torque $M_A$ of the motor 6, rotational speed $n_R$ of the motor 6, and the position y of the transmitter (gas pedal) 1. In the example illustrated, the memory storage unit 36 contains, for various values ($y_1$, $y_2$, $y_3$) of the position y of the transmitter 1, one characteristic each for the dependence of the instantaneous drive torque $M_A$ on the rotational speed $n_A$.

By a family of motor characteristics, other such characteristics which indirectly describe the operating status of the motor 6 are also included; such as, a family of characteristics which contains the dependence of the drive torque $M_A$, rotational speed $n_A$, and the injection time.

In addition, "torques" as used here, also include drive factors in general; such as, power values or other comparable values, which include the drive torque as only one of several operands.

The position y of the fuel transmitter 1 is conducted to a signal input 39 of the memory storage unit 36, via a signal line 40, which is connected to the signal output 2 of the fuel transmitter 1. The speed of rotation $n_A$ of the motor 6 is determined by means of a sensor 7 from the shaft 8, and is conducted via a signal line 38 to a signal input 37 of the family of motor characteristics memory storage unit 36. The family of motor characteristics memory storage unit 36 is designed so that for each value pair y/$n_A$, the instantaneous drive torque $M_A$ is available at its signal output 35. The motor torque $M_A$, however, can also be measured directly with a suitable sensor 7.

The speed of rotation $n_A$ of the motor 6 can also be computed from the speed of rotation $n_R$ of the wheel 15, if the current transmission ratio of the transmission 12 is taken into consideration.

In the weight determination apparatus 30 for the determination of the weight G of the vehicle, the ratio between the instantaneous drive torque $M_A$ of the motor 6 and a difference between two operands is formed, whereby the above-mentioned operands always include an acceleration value $\ddot{s}$ corresponding to the acceleration of the vehicle. These two acceleration values $\ddot{s}_{x2}$ and $\ddot{s}_{x1}$ are determined at different times, whereby at least one of the acceleration values is preferably determined at a time when the vehicle is not being driven, e. g., when it is between shifts. In this nondriven state, the vehicle is neither significantly accelerated nor decelerated.

To be able to perform the calculation operation, the instantaneous drive torque $M_A$ of the motor 6 is conducted to the weight determination apparatus 30 via the signal line 34 and a signal input 33. The temporal curve of the speed of rotation $n_R$ of the driven wheel 15, required for the formation of the acceleration values $s_{x2}$ and $s_{x1}$, is conducted to the weight determination apparatus 30 via the signal line 17 and a signal input 32. Via the signal line 23, then, a signal input 31 of the weight determination apparatu 30 is informed of the time at which the clutch 9 is opened. Thus, a distinction can be made between such times in which the vehicle is driven by the motor 6, and such times in which the vehicle is not driven by the motor 6. The acceleration values $s_{x2}$ and $s_{x1}$ are also measured or determined at these different times.

All the above-mentioned electrical connection lines can be made single-pole or multi-pole, and therefore can also transmit several different signals.

The general formula for the determination of the vehicle weight G reads:

$$G = \frac{M_{A1} - M_{A2}}{f(\ddot{s}_{x1}) - f(\ddot{s}_{x2})}$$

Values with index 1 are determined at time 1, and values with index 2 are determined at time 2.

In addition to the special case $M_{A2}$, which is applicable for the interval between shifts, the special case $f(\ddot{s}_{x2})$ can also be evaluated. This case is equivalent to unaccelerated travel.

The above equation can naturally also be evaluated generally, without the special cases. Care must always be taken that the two measurement points are not taken too far apart from one another. However, to obtain a sufficient precision for the weight value, the difference between the drive torques $M_{A1}$ and $M_{A2}$ should be selected as large as possible.

The weight determination apparatus 30 can also be designed so that variously-determined weight values G are used for the formation of an average value for the weights G, and so that the average of the weights G determined in this manner does not exceed a predetermined change.

To make certain that even when in the weight determination apparatus 30, for example, because of too short a time in operation, there is not a sufficiently precise value for the weight G to be able to determine a usable value for the stationary or constant speed drive torque $M_{stat}$ in the torque control apparatus 24; it is advantageous, instead of the weight G determined by the weight determination apparatus 30, to first use an average weight $G_O$ which corresponds, for example, to a half-loaded vehicle.

For an accurate determination and calculation of the weight value G, a microcomputer can advantageously be incorporated into the weight determination apparatus 30 by means of which, in particular, the time-dependent computation processes regarding the acceleration values $\ddot{s}_{x1}$ and $\ddot{s}_{x2}$ can be carried out in a relatively simple manner.

For the control of the transmission 12, there is a transmission control apparatus 18, shown schematically. The values of the wheel rotation $n_R$, the motor torque $M_A$, and the stationary or constant speed drive torque $M_{stat}$ are conducted to the transmission control apparatus 18. In the simplest case, the transmission control apparatus 18 operates so that the transmission 12 is automatically shifted as a function of the speed of the vehicle, and thus as a function of the speed of rotation $n_R$ of the driven wheels 15. For the measurement of the speed of rotation $n_R$ of the driven wheel 15, there is a sensor 16 whose speed signal is conducted via the signal line 17 to a signal input 19 of the transmission control apparatus 18. By means of a signal output 22 and the signal line 23, the transmission control apparatus 18 is connected with the signal input 13 of the transmission 12 and the signal input 10 of the clutch 9.

If, in the transmission control apparatus 18, as a function of the speed of the vehicle and taking into consideration specified selection criteria, a new gear is selected, then the clutch 9 is activated by means of its signal input 10; and then, with a disengaged clutch, the transmission 12 is shifted via its signal input 13 by the transmission control apparatus 18; then the clutch 9 is reengaged. The control or activation of the clutch 9 and of the transmission 12 can, as is known in the art, be done purely mechanically by means of servomotors of the transmission control apparatus 18 and is within the limits of the present invention.

It is also possible to include in the above-mentioned selection criteria, according to which a new gear is determined in the transmission control apparatus 18; there is also an examination of whether the new operating point, after the engagement of the newly-selected gear, is in the vicinity of the most efficient operating range.

To simplify the representation, such an apparatus is not shown in the illustration, but it is a part of the transmission control apparatus 18.

The above-mentioned selection of an optimal gear with the transmission ratio $i_{new}$ is done by a shift command signal transmitter 51, which is part of the transmission control apparatus 18.

The shift command signal is conducted via lines 53 and 55 to a shift control unit 56. The latter apparatus 56 takes care of the proper sequencing of the control commands to the shift cylinders and to the clutch 9, which are necessary for the engagement of the selected gear. The commands are conducted, via the output 22, to the transmission 12 and the clutch 9.

The shift signals issued by the shift command signal transmitter 51 can be interrupted by a blocking signal 57 of a downhill gear coordination device 52.

This is the case whenever there is a signal on a signal line 57. This signal is given to a blocking element 54, which is connected between the signal lines 53 and 55. The blocking signal on the signal line 57 is then discontinued by a first gear comparator 58, if the new transmission ratio $i_{new}$ suggested by the shift command signal transmitter 51 is less than the transmission ratio $i_x$ assigned to the current stationary or constant speed drive torque $M_{stat}$ by a torque comparator device 60, or by the road slope.

The stationary or constant speed drive torque $M_{stat}$ which, as mentioned above, is necessary for the nonaccelerating drive of the vehicle; has a negative value on a downhill slope. This value is greater, the steeper the downhill slope and the heavier the vehicle. In the torque comparator unit 60, a table is stored, which assigns the appropriate optimal downhill gear to the various values of $M_{stat}$. Thus, for example, for a high value of $M_{stat}$, in the range between the limits c and d, a high transmission ratio ($i_4$) is optimal.

The optimal downhill transmission ratios $i_x$ can, in the table of the torque comparator unit 60, also correspond to the road slope p instead of the stationary or constant speed torque $M_{stat}$. Thereby, the slope must naturally be determined by an apparatus in the vehicle. The vehicle weight G, then, must naturally be stored in the table too.

As already noted, on a downhill slope, an automatic transmission would propose a gear which is too high or a transmission ratio $i_{new}$ which is too small. To prevent this, the transmission ratio $i_{new}$ calculated in the shift command signal transmitter 51 is sent via a signal line 59 to a first gear comparator 58. This gear comparator 58 simultaneously receives the optimal value $i_x$ from the torque comparator unit 60 via a signal line 61. If the comparison of $i_{new}$ and $i_x$ shows that the optimal transmission ratio $i_x$ is greater than the calculated transmission ratio $i_{new}$, a blocking signal is produced on the signal line 57, and an upshift is thereby prevented.

The optimal downhill transmission ratio $i_x$, sent by the torque comparator unit 60 via the signal line 61, is forwarded to a second gear comparator unit 62. There, it is examined whether the present transmission ratio $i_{present}$ is less than the transmission ratio $i_x$ determined by the torque comparator unit 60. If this is the case, a signal is sent via a signal line 63 to an AND element 64. At the outlet of the AND element 64, via a signal line 65, a signal is then sent to an indicator means, such as a light 66; and this light 66 is illuminated if, in addition to the first inlet signal line 63, there is also a signal on the second inlet signal line 67. This signal on the signal line 67 is then emitted by a comparator apparatus 68 if the instantaneous drive torque $M_A$ of the motor is less than or approximately equal to zero, i. e., if the driver is not stepping on the gas pedal 1 or braking with the motor 6.

The illumination of the indicator light 66 is intended to signal to the driver that he is in a transmission ratio which is too low for the current slope, and he should shift into a higher transmission ratio, or into a lower gear. Another possibility is that, on the gear recommendation, if any, the recommended gear be made to blink (not shown).

It should be understood by those skilled in the art that all of the calculations and comparisons can be made with relatively simple logic circuits. However, in practicing the best mode, it is preferred that such calculations and comparisons be performed in a microprocessor to increase both the speed and reliability.

Normally, it would also be possible, by means of the indicator signal on the line 70, to cause the shift command signal transmitter 51 to directly shift the transmission back into a higher transmission ratio or a lower gear. This is not permissible, however, if the maximum allowable motor 6 speed would thereby be exceeded. The illumination of the indicator light 66, therefore, signals to the driver that he should first of all brake the vehicle, before a downshift is possible.

The determination of the limit values a, b, c, d in the torque comparator unit 60 is made according to the motor 6, transmission 12, and other vehicle parameters. Therefore, a vehicle on a downhill slope is not in danger if the braking force of the motor 6 and a motor brake, if any, or other retarders are sufficient, without additional operating brake forces to allow unaccelerated downhill travel of the vehicle. Since the brake force increases with the transmission ratio, a transmission ratio $i_x$ can be determined empirically for any given vehicle and for a given downhill slope, which may not be exceeded. This criterion can serve as the limit value for the assignment of the transmission ratio $i_x$ to the downhill slope in question. This results in a minimum speed or the lowest gear with the greatest transmission ratio.

Since, however, it must be assumed that the driver on the downhill slope can also activate the operating brakes and retarders, a higher speed of travel and therefore a lower transmission ratio $i_x$ and a higher gear can also be determined, at which this speed of travel on the downhill slope in question still does not present any risk. Thus, for example, for a downhill slope of 5%, a maximum speed of 60 km/h can still be considered safe. According to this rule, a lowest limit for the assignment of the transmission ratio $i_x$ to the downhill slope can be defined. The operating brake may naturally not be overheated, even on a long downhill slope.

Thus, a range of transmission ratio $i_x$ to be assigned to different downhill slopes without risk is defined in the torque comparator unit 60. The transmission ratio $i_x$ can be selected in an individual case. It can advantageously be made a function of a travel program selected by the driver (e. g. economy or speed). Such program can take into account such things as the drive torque $M_A$ controlled by the driver, the magnitude of the braking force of the operating brakes, or other selected control factors. These control factors are conducted to the torque comparator 60, symbolically represented, by means of a line 69 from a travel program transmitter apparatus 71.

To prevent a constant changing of the transmission ratio on the vehicle for very short downhill stretches, a timer element 80 can also be integrated into the line 65 to delay the signal to the indicator lamp 66 by a specified length of time.

While the preferred and various alternative embodiments have been shown and described, it should be understood that other modifications and adaptations will become apparent to those persons skilled in the transmission control art without departing from the spirit and scope of the appended claims.

We claim:

1. An on vehicle apparatus to determine transmission gears engageable on a vehicle traversing a downhill grade of a roadway, said apparatus comprising:
   (a) a means positioned on such vehicle for generating a first signal having a value representative of an instantaneous drive torque ($M_A$) of such vehicle;
   (b) a means positioned on such vehicle for generating a second signal having a value representative of a constant speed drive torque ($M_{stat}$) of such vehicle;
   (c) a first comparator means connected to receive said value of said second signal for comparing said value of said second signal with a function which correlates a relationship between said values of $M_{stat}$ with a steepness of a downhill grade and for generating a third signal having a value representative of a gear ratio that will provide a predetermined braking effect by a motor of such vehicle;
   (d) a means for determining if said $M_A$ drive torque is tending to retard said vehicle and for generating a fourth signal representative of said retarding drive torque;
   (e) a comparator means connected to receive said value of said gear raio signal for comparing said value of said gear ratio signal with a value representative of an engaged gear ratio and for generating a fifth signal when said value of said engaged gear raio is less than said value of said gear ratio signal; and
   (f) a logic AND element connected to receive said fourth signal and said fifth signal for generating a sixth signal indicative of a gear change that will maintain said predetermined motor braking effect when both said fourth signal and said fifth signal are simultaneously received by said logic AND element.

2. An on vehicle gear determination apparatus, according to claim 1, wherein said apparatus further comprises a gearshift command signal transmitter connected to receive said sixth signal for calculating the ratio of the new gear and for outputting a signal having a value representative of said ratio of said new gear and for outputting a shift command signal.

3. An on vehicle gear determination apparatus, according to claim 2, wherein said apparatus further comprises:
  (a) a comparator means connected to receive said value of said third signal and said value of said signal representative of said new gear ratio for comparing said signals and for generating a blocking signal when said value of said third signal is less than said value of said new gear ratio; and
  (b) a blocking element connected to receive said shift command signal and said blocking signal for outputting said shift command signal when both signals are not simultaneously received by said blocking element.

4. An on vehicle gear determination apparatus, according to claim 3, wherein said apparatus further comprises a shift control means connected to receive said shift command signal for changing gears on such vehicle.

5. An on vehicle gear determination apparatus, according to claim 1, wherein said apparatus further comprises an indicator means connected to receive said sixth signal for indicating to a driver of such vehicle that a gear change is indicated.

6. An on vehicle gear determination apparatus, according to claim 5, wherein said apparatus further comprises a time delay means for delaying said indicator means generation of said sixth signal for a predetermined time.

7. An on vehicle gear determination apparatus, according to claim 1, wherein said means for generating said first and second signals comprise part of a microcomputer for making necessary calculations and comparisons.

8. A method of determining transmission gears of a vehicle traversing a downhill grade of a roadway to utilize a predetermined braking effect by a motor, said method comprising the steps of:
  (a) generating a first signal having a value representative of an instantaneous drive torque ($M_A$) of such vehicle;
  (b) generating a second signal having a value representative of a steepness of said downhill grade of said roadway at a point of travel of said vehicle;
  (c) comparing said value of said second signal with a function which correlates a relationship between steepness values and gear ratios that will provide said predetermined braking effect;
  (d) determining said braking effect of said motor;
  (e) generating a third signal having a value representative of a gear ratio that will provide said determined braking effect by said motor;
  (f) generating a fourth signal representative of when said drive torque is trying to retard said vehicle;
  (g) comparing said value of said gear ratio signal with a value representative of an engaged gear ratio;
  (h) generating a fifth signal when said value of said engaged gear ratio is less than said value of said gear ratio signal; and
  (i) generating a sixth signal indicative of a gear change that will maintain said predetermined motor braking effect when both said fourth signal and said fifth signal are simultaneously generated.

9. A method, according to claim 8, wherein said value of said second signal generated in step (b) has a value representative of a constant speed drive torque ($M_{stat}$) of said vehicle and said function correlates a relationship between said values of $M_{stat}$ with said steepness of said downhill grade.

10. A method, according to claim 9, wherein said method comprises the additional steps of:
  (a) inputting said sixth signal into a gearshift command signal transmitter;
  (b) calculating a ratio of the new gear;
  (c) outputting a signal having a value representative of said ratio of said new gear; and
  (d) outputting a shift command signal.

11. A method, according to claim 10, wherein said method comprises the additional steps of:
  (a) inputting said value of said third signal and said value of said signal representative of said new gear ratio into a comparator;
  (b) comparing said signals;
  (c) generating a blocking signal when said value of said third signal is less than said value of said new gear ratio;
  (d) inputting said shift command signal and said blocking signal into a blocking element; and
  (e) outputting said shift command signal when both signals are not simultaneously received by said blocking element.

* * * * *